United States Patent
Roettger

(10) Patent No.: US 11,638,981 B2
(45) Date of Patent: May 2, 2023

(54) ROLLING DEVICE FOR ROLLING WORK PIECES HAVING A TOOTHING, AND ASSOCIATED METHOD

(71) Applicant: ECOROLL AG WERKZEUGTECHNIK, Celle (DE)

(72) Inventor: Karsten Roettger, Celle (DE)

(73) Assignee: ECOROLL AG WERKZEUGTECHNIK, Celle (DE)

( * ) Notice: Subject to any disclaimer, the term of this patent is extended or adjusted under 35 U.S.C. 154(b) by 324 days.

(21) Appl. No.: 16/076,828

(22) PCT Filed: Jan. 25, 2017

(86) PCT No.: PCT/EP2017/051560
§ 371 (c)(1),
(2) Date: Aug. 9, 2018

(87) PCT Pub. No.: WO2017/137258
PCT Pub. Date: Aug. 17, 2017

(65) Prior Publication Data
US 2019/0047114 A1    Feb. 14, 2019

(30) Foreign Application Priority Data
Feb. 11, 2016   (DE) ............... 10 2016 102 429.5

(51) Int. Cl.
| | |
|---|---|
| B24B 39/04 | (2006.01) |
| B21H 5/02 | (2006.01) |
| B23F 19/00 | (2006.01) |
| B21H 7/18 | (2006.01) |

(52) U.S. Cl.
CPC ......... B24B 39/045 (2013.01); B21H 5/022 (2013.01); B21H 7/187 (2013.01); B23F 19/00 (2013.01)

(58) Field of Classification Search
CPC ......... B21H 5/022; B21H 7/187; B21H 5/00; B21H 8/02; B21H 5/02; B21H 7/18;
(Continued)

(56) References Cited

U.S. PATENT DOCUMENTS

| | | | | | |
|---|---|---|---|---|---|
| 2,607,175 | A | * | 8/1952 | Osplack | .................. B23F 5/04 451/47 |
| 5,528,917 | A | * | 6/1996 | Bajraszewski | ......... B21H 5/022 72/10.6 |

(Continued)

FOREIGN PATENT DOCUMENTS

| | | |
|---|---|---|
| CN | 201768861 U | 3/2011 |
| CN | 104741493 A | 7/2015 |

(Continued)

OTHER PUBLICATIONS

Machine translation of DE 3422354 A1 (Year: 1985).*

*Primary Examiner* — Shelley M Self
*Assistant Examiner* — Teresa A Guthrie
(74) *Attorney, Agent, or Firm* — WCF IP

(57) ABSTRACT

A rolling device for work pieces with toothing, in particular gear wheels, includes first and second shaping tools which are guided by a guide relative to the work pieces. With respect to the work pieces, a first region of a tooth flank is shaped with the first shaping tool and a second region of the tooth flank is shaped by the second shaping tool. The first and second shaping tools are respectively mounted on first and second rollers. The second roller has an axial thickness on the circumference, which differs from the axial thickness of the first roller such that the second region of the tooth flank is different from the first region.

14 Claims, 13 Drawing Sheets

(58) Field of Classification Search
CPC ... B21H 9/00; B23F 19/00; B23F 5/02; B23F 23/10; B23F 19/05; B23F 23/12; B24B 39/04; B24B 39/045; B21B 27/02; Y10T 29/49462; Y10T 29/49476; Y10T 29/49478; Y10T 28/49462; Y10T 28/49476; Y10T 28/49478; B23P 15/14
USPC ......... 29/893.3, 893.32; 409/4; 451/47, 253; 72/110
See application file for complete search history.

(56) References Cited

U.S. PATENT DOCUMENTS

| | | | |
|---|---|---|---|
| 5,711,187 A * | 1/1998 | Cole | B21H 5/022 29/893.32 |
| 6,151,941 A * | 11/2000 | Woolf | B21H 5/022 72/102 |
| 2015/0183021 A1 | 7/2015 | Nagata | |

FOREIGN PATENT DOCUMENTS

| | | | |
|---|---|---|---|
| DE | 29 22 639 A1 | 12/1980 | |
| DE | 34 22 354 A1 | 2/1985 | |
| DE | 3422354 A1 * | 2/1985 | ............. B23F 19/00 |
| DE | 19516834 A1 | 11/1996 | |
| DE | 196 25 285 A1 | 1/1998 | |
| DE | 195 11 882 B4 | 1/2005 | |
| DE | 19511882 B4 | 1/2005 | |
| EP | 0163922 B1 | 7/1989 | |
| EP | 0 616 863 A1 | 9/1994 | |
| GB | 1336450 A | 11/1973 | |
| JP | 54-41253 A | 4/1979 | |
| JP | 5994545 A | 5/1984 | |
| JP | 5-277610 A | 10/1993 | |
| JP | 2001-129630 A | 5/2001 | |
| JP | 2001129630 A * | 5/2001 | |
| WO | 2007128013 A1 | 11/2007 | |

* cited by examiner

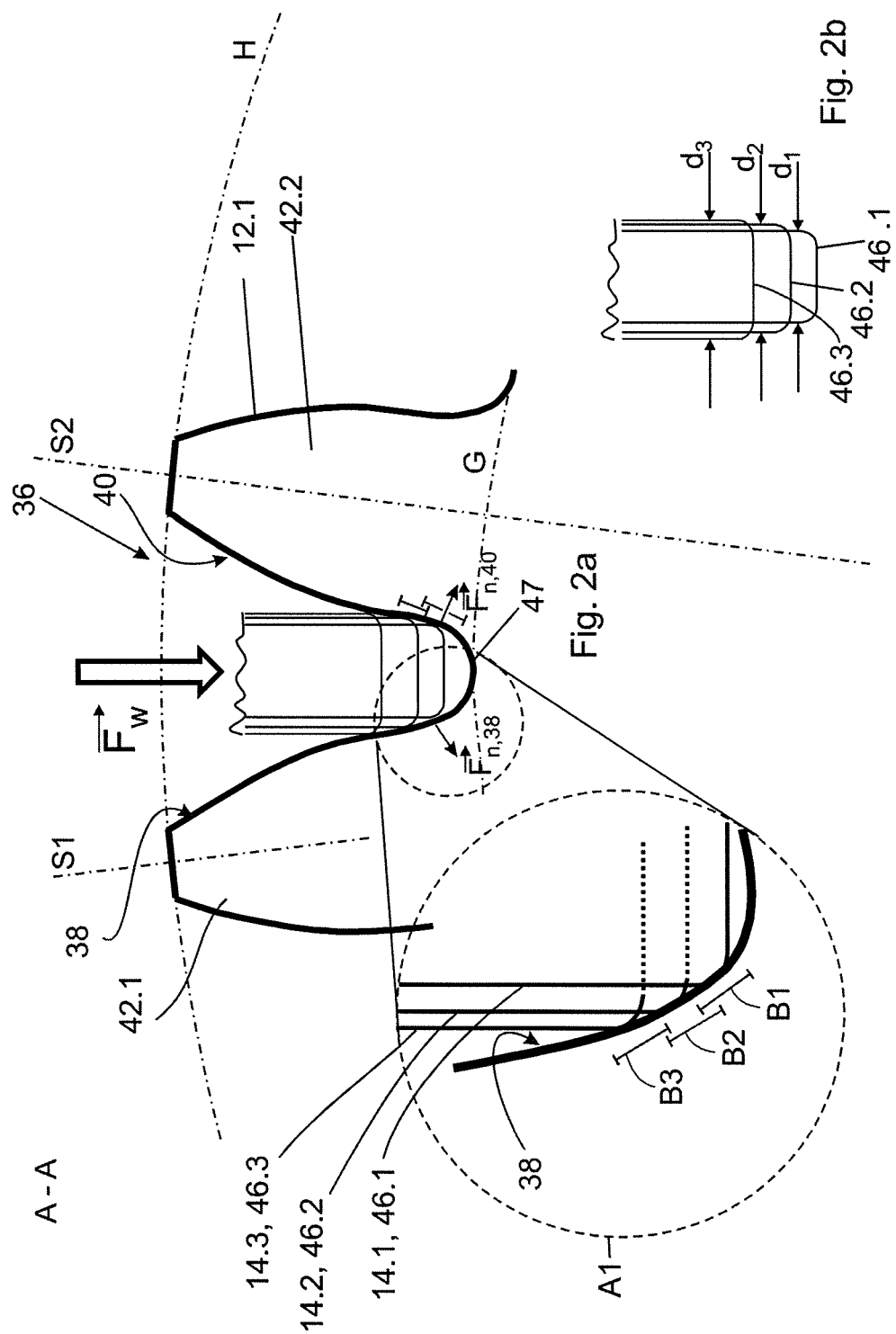

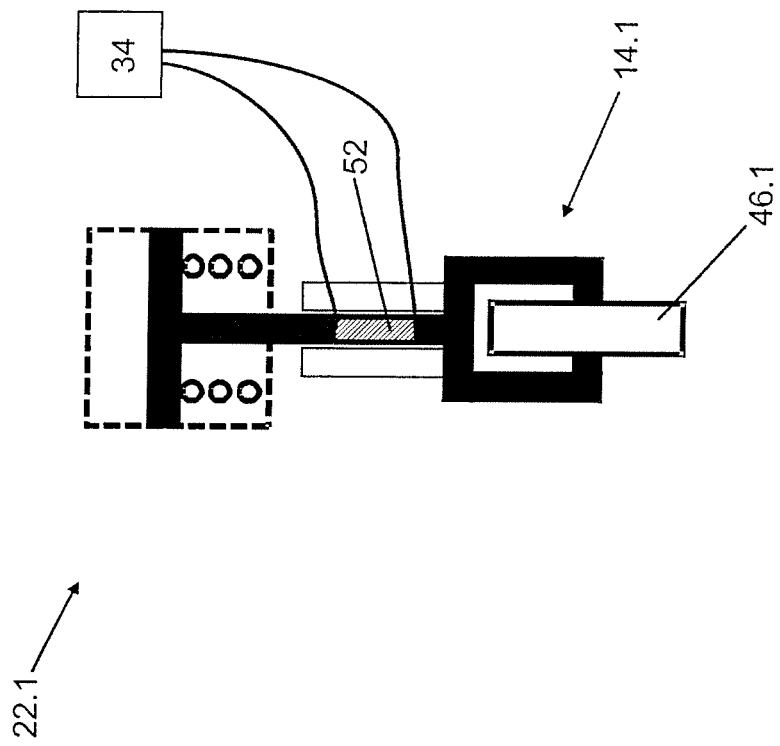

ROLLING DEVICE FOR ROLLING WORK PIECES HAVING A TOOTHING, AND ASSOCIATED METHOD

The invention relates to a rolling device for rolling work pieces with a toothing, and a corresponding rolling method. In the production of work pieces with a toothing, for instance gear wheels, gear racks or similar, the toothing is generally the weakest part of the component. Therefore, it is necessary to configure the toothing in such a way that it can support as great a load as possible over a long period of time. The known method for doing so is to increase the fatigue strength of toothings by inducing compressive residual stresses. To this end, the tooth bases, i.e. the areas of a toothed work piece with the smallest diameter, are e.g. shot blasted. However, this process is complex and results in less smooth surfaces.

DE 29 22 639 A1 describes a device that comprises a shaping roller that is pressed between two teeth of a gear wheel. This reinforces the flanks of the two teeth that are facing each other. The disadvantage of this device is the low degree of productivity.

DE 195 16 834 A1 describes the rolling of several turbine blades that are arranged behind one another using a tool with a hydrostatically supported rolling sphere that compresses the base of a groove. A corresponding tool also has a comparatively low degree of productivity.

EP 0 163 922 B1 describes a device for processing a set of gear wheels by the hydrostatic pressing of disc-deformation elements against the toothing flanks. The disadvantage of this device is that it is either only capable of inducing low compressive residual stresses or it has to build up extremely high liquid pressures, which is complex.

DE 196 25 285 A1 describes a device for the fine machining of the tooth flanks of a gear wheel. The gear wheel with external toothing that is to be processed is smoothed in a non-cutting process by means by a tool with internal toothing. It is not possible to induce compressive residual stresses in this way.

DE 195 11 882 B4 describes a rolling device for inducing compressive residual stresses into a cylindrical external surface of a component. This device is not suitable for gear wheels.

The invention aims to improve the production of work pieces with toothing.

The invention solves the problem by means of rolling device with the features of claim 1. The invention also solves the problem by means of a method according to the independent method claim.

The advantage of this invention is that the use of at least two shaping tools means that the work piece can be processed quickly and in a way that enables it to be reproduced. This is especially advantageous in mass production, for instance of gear wheels.

It is also beneficial that the shaping tools can be designed as drums or rollers, thereby enabling the creation of a smooth surface in addition to the induction of compressive residual stresses. The invention thus not only improves the wear resistance but also the surface quality of the work pieces.

Within the scope of the present description, the term rolling should be understood to mean a machining process which causes the state of residual stress of the work piece to change. The rolling preferably does not cause a change in thickness, for example of the region that is to be processed, or causes only an insignificant change, in particular of less than 1 tenth of a percent. In other words, the rolling specifically refers to a process for changing the properties of the subsurface, in particular the strain hardening and/or the residual stresses and/or the micro-topography, such as the roughness or surface roughness, but not to a process for changing the macro geometry.

A shaping tool should be understood particularly to mean a tool that is configured to change the state of residual stress and/or the state of strain hardening and/or the micro-topography.

The feature that the guide is designed for the guided movement of the shaping tools relative to a work piece should be understood especially to mean that the guide is designed in such a way that it enables a guided relative movement between the shaping tools and the at least one work piece. A guided movement is a movement which cannot deviate from a predefined guide path. A relative movement means that either the shaping tools move on a predefined path or the at least one work piece moves on a predefined path or that both the shaping tools and the at least one work piece move on respective predefined paths.

In particular, the guide can be a device that is designed to move the shaping tools relative to a second bearing element, especially one that is stationary. It is possible, but not necessary, for all shaping tools to be fixed to a first bearing element. It is also possible for groups of shaping tools, or even each individual shaping tool, to each be fixed to a first bearing element, wherein several such guide elements are guided relative to a common second bearing element.

It is thus possible, and represents a preferred embodiment, that all shaping tools are immovable relative to one another in terms of a linear movement and in particular are rigidly coupled with one another. However, it is also possible that the shaping tools can be moved in pairs or groups relative to one another. For example, several shaping tools may be fixed individually or in groups to a slide that is able to move independently of at least one other slide, to which at least one other shaping tool is attached.

The rolling should be understood especially to mean a deep rolling or smooth rolling. Deep rolling should be understood to mean a processing of the surface of the work piece that results in a reduction of the disadvantageous tensile residual stresses, especially when compressive residual stresses are induced into an area of the work piece where tensile residual stresses were previously present and/or that results in an increase in the cold deformation condition of the subsurface.

The work piece should be understood to mean, for example, a gear wheel, especially a spur wheel, a bevel wheel, a splined shaft or a multiple spline hub. In general, the work piece with toothing should be understood especially to mean a work piece that transfers a force or a torque via the toothing during operation.

A toothing should be understood particularly to mean a structure that comprises equidistantly arranged teeth. In particular, the teeth may be equidistantly arranged in terms of an angle or a distance. It is especially preferable if the work piece has external toothing.

The second tooth flank can be designed to be on the same tooth, an adjacent tooth or another non-adjacent tooth.

A region should be understood to mean an area in the tooth cross-section of a tooth. The feature that the second region differs from the first region should be understood to mean that an area exists that belongs to the second region but not to the first, and that an area exists that belongs to the first region but not to the second. It is possible, but not necessary, for an area to exist that belongs to both the first region and the second region.

The feature that the shaping tool is designed such that the corresponding regions can be shaped should be understood especially to mean that the regions are shaped during operation of the rolling device.

The first shaping tool comprises a first roller that is rotatably mounted about a first tool rotational axis, and the second shaping tool is a second roller that is rotatably mounted about a second tool rotational axis. The terms roller and drum shall be used synonymously in the present description. It is beneficial if the roller is disc-shaped, i.e. that its radius is greater than its maximum thickness. In particular, the radius is at least three times, preferably at least five times, greater than the maximum thickness. The thickness describes the extension in the axial direction.

This type of shaping tool is preferably fixed to the guide such that, when in operation, the roller rolls on the work piece without slipping at at least one point. This point generally moves on the work piece.

Alternatively or additionally, at least one of the shaping tools may comprise a sliding element. This sliding element is preferably designed to be at least partially convex and in particular is partially cylindrical or spherical. A sliding element is an element that is fixed to the guide in such a way that, when in operation, it slides past the surface of the work piece, thereby smoothing the subsurface of the work piece and/or inducing compressive residual stresses. It is favourable if the sliding element is connected to an ultrasound source that allows the sliding element to oscillate to and away from the work piece.

The rolling device preferably has a third shaping tool, which in particular comprises a third roller that is rotatably mounted about a third tool rotational axis, and a fourth shaping tool, which in particular comprises a fourth roller that is rotatably mounted about a fourth tool rotational axis, wherein a third region of the tooth flank of the work piece can be shaped using the third shaping tool, the third region being different to the second and first region, and wherein a fourth region of the tooth flank can be shaped with the fourth shaping tool, the fourth region being different to the other three regions. It is beneficial if at least two of the tool rotational axes run parallel to one another.

The feature that two tool rotational axes run parallel to one another should be understood especially to mean that it is possible, but not strictly necessary, for the two rotational axes to run parallel to one another in the mathematical sense. Rather, a technical parallelism is meant, i.e. that small deviations between the strict mathematical parallelism and the actual parallelism are possible. In particular, a deviation of up to 1.5° is tolerable.

The rolling device preferably comprises a number of shaping tools, wherein at least the majority of the shaping tools is arranged to shape the different regions of the tooth flank of the work piece, especially the gear wheel. The more shaping tools available, the wider the total region of the work piece that can be processed. Accordingly, the subsurface of the work piece can be processed more intensively with several shaping tools.

The shaping tools are preferably attached to the at least one guide such that at least the majority of the tool rotational axes follow the same trajectory. In other words, at least the majority of the tool rotational axes are rigidly coupled relative to one another by means of the guide. In particular, the guide comprises a retaining element for each shaping tool that holds the respective rotational axis. The retaining elements are then rigidly connected to one another, i.e. they cannot move relative to one another.

The trajectory should be understood particularly to mean the curve covered by the tool in the space.

The first shaping tool has a first roller that has a first effective axial thickness on the circumference thereof and the second shaping tool has a second roller that has a second effective axial thickness on the circumference thereof that is different to the first effective axial thickness. The axial thickness should be understood to mean the distance of two points which, when in operation, are simultaneously engaged with the tool on opposite sides. If the roller of the relevant shaping tool is convex about its circumference, the effective axial thickness is the same as the thickness of the tool. The varying effective thicknesses means that different zones of the tooth flank are processed.

The rolling device preferably has a work piece accommodation, in particular a gear wheel accommodation, for housing a first work piece, in particular a first gear wheel, and at least a second work piece, in particular a second gear wheel, wherein the at least one guide is designed to guide the shaping tools relative to the work piece accommodation. In particular, the guide is configured in such a way that the shaping tools are guided along the tooth flanks of the work pieces such that two opposing tooth flanks of the work pieces are processed. The opposing tooth flanks may refer to two tooth flanks of the same tooth or adjacent teeth.

The guide is preferably designed to guide the shaping tools along a straight trajectory. In other words, the guide may be a linear guide.

It is favourable if the work piece accommodation is a gear wheel accommodation and designed to house gear wheels at a helix angle. This should be understood to mean that gear wheels, especially gear wheels with oblique teeth, can be arranged on the gear wheel accommodation such that for each gear wheel, at least one tooth comes together with the teeth of other gear wheels to form a continuous groove. For gear wheels with straight teeth, the helix angle is 0°, meaning that the gear wheels can be simply arranged behind one another so that they are not twisted relative to the gear wheel in front. The groove is then linear. For gear wheels with oblique teeth, the groove runs helically.

The rolling device preferably has a rotation device, especially a rotary actuator, for rotating the work pieces and/or the gear wheel accommodation relative to the guide. It is then possible to move the shaping tools in a straight line so they run in the groove. It is possible to move the gear wheels relative to the guide each time the shaping tools have passed through a groove. This type of process is especially easy to execute and a corresponding device is easily constructed; nevertheless, it is still effective. It is especially well suited for gear wheels with straight teeth.

Alternatively or additionally, the rotation device may comprise a break and/or an end stop. In this case, the gear wheel accommodation can be rotated by applying a torque, for example by means of one of the shaping tools, wherein the rotation device interrupts the rotation produced by the torque if the correct angular position is reached.

The rotational axes of the shaping tools preferably run at a tool angle to the trajectory that is different to 90°. It is beneficial if the tool angle corresponds to the helix angle. Alternatively, it is however also possible that the tool angle is the sum of the helix angle and a tilt angle, wherein the tilt angle preferably has a value of between minus 2° and plus 2°.

In this case, it is especially favourable if the rolling device comprises a rotary actuator that is configured to continuously rotate the work piece accommodation relative to the guide, wherein the rotation of the work piece accommodation is synchronised with the movement of the shaping tools such that the shaping tools (or in other words, the rollers of the respective shaping tool) run in at least one groove. It is then possible to process gear wheels with oblique teeth if the guide is a linear guide.

The linear guide preferably guides along the longitudinal axis of the work piece accommodation. If gear wheels are placed on the work piece accommodation, their tooth flanks preferably come together to form a continuous groove that runs along the longitudinal axis at the helix angle.

The shaping tools are preferably arranged behind one another in a single track in terms of the trajectory, i.e. the shaping tools run in the same groove.

The shaping tools are preferably attached to the guide in such a way that at least two shaping tools can simultaneously engage with the same work piece. In particular, the shaping tools can be attached to the guide such that at least two non-adjacent teeth of the same work piece can be processed simultaneously. This reduces the machining time. The shaping tools are then fixed to the guide element along a circular arc or a helix.

It is especially preferable for the shaping tools to be attached to the guide in such a way that more than one shaping tool can engage with the first work piece and at the same time, more than one shaping tool can engage with a second work piece. In particular, the shaping tools can be attached to the guide such that at least one third, especially more than half, of all the teeth can be processed simultaneously.

It is beneficial if the shaping tools are fixed to simultaneously roll two opposing flanks of adjacent teeth on the guide. In this case, the shaping tools may only comprise rollers that are designed such that they pass between two tooth flanks, thereby producing an axial force component by way of a rolling force that pushes the shaping tool into the gap between the teeth; the axial force component then shapes the tooth flank.

In its most general form, the invention solves the problem by means of a rolling device for rolling work pieces with a toothing, in particular gear wheels, with (a) a first shaping tool, (b) at least a second shaping tool and (c) at least one guide to which the shaping tools are fixed and that is designed for the guided movement of the shaping tools such that a first region of a tooth flank of the work piece can be shaped with the first shaping tool and a second region of the tooth flank, which is different to the first region, and/or a second region of a second tooth flank can be shaped with the second shaping tool, i.e. it is shaped during operation of the rolling device.

In its most general form, the invention also solves the problem by means of a method for rolling the teeth of a work piece with the steps (a) arranging of the work piece on a work piece accommodation and moving a first shaping tool and at least a second shaping tool jointly and in a guided way relative to the work piece accommodation, such that a first region of a tooth flank of the work piece is shaped with the first shaping tool and a second region of the tooth flank, which is different to the first region, and/or a second region of a second tooth flank is shaped with the second shaping tool. The properties or features above and those listed below, as well as preferred embodiments, apply to both the invention in its most general form and its form according to the independent claims.

Alternatively, the shaping tools are configured to simultaneously roll opposing tooth flanks of each respective tooth.

In a further alternative form, the shaping tools are designed in such a way that opposing flanks of adjacent teeth are shaped by two different shaping tools.

It is beneficial if the shaping tools are arranged to simultaneously apply a first rolling force component, which acts on a first tooth flank, and a second rolling force component, which acts on the opposite tooth flank, wherein the first rolling force component corresponds in terms of value to the second rolling force component. The opposing tooth flank may be on the same or an adjacent tooth.

The feature that the two rolling force components correspond to each other should be understood especially to mean that it is possible, but not necessary, for the two rolling forces to be exactly equal in terms of value. Rather, it is also possible that they differ from one another by a small amount, for instance by a maximum of 15%, especially a maximum of 10%. This guarantees a symmetrical processing of the opposing tooth flanks.

In this case, it is also beneficial if the guide is arranged relative to the work piece accommodation such that, in the main, a torque is not generated on the work pieces.

This should be understood especially to mean that a torque $|\vec{M}|$ occurs for whose value $|\vec{M}|=|\vec{F}_W \times \vec{r}|=|\vec{F}_W|$ sin $\sphericalangle(\vec{F}_W, \vec{r})$ applies, wherein $\sphericalangle(\vec{F}_W, \vec{r}) \leq 10°$, in particular $\sphericalangle(\vec{F}_W, \vec{r}) < 5°$, applies.

According to a preferred embodiment, at least one shaping tool comprises two drums that are attached to a common tool retainer, as well as one tool retainer to which both drums are rotatably attached. Both drums each have a tool rotational axis which, according to an embodiment, run parallel to one another. Alternatively, the two tool rotational axes run at an angle to one another, wherein in this case, the shaping tools preferably run in the same direction. For instance, the shaping tools are in the shape of a truncated cone; they may also be spherical.

According to a preferred embodiment, the two rollers are arranged such that they come into contact with one another. In other words, the rollers are arranged so closely to one another that they support one another when they each engage with a tooth flank. The tooth flanks are then designed to be on opposing teeth.

It is favourable if at least one drum of a shaping tool comprises a continuous drum groove about its circumference so two opposing flanks of the same tooth of the work piece can be rolled simultaneously with this shaping tool. A rolling force acting on the shaping tool then causes the drum groove to bend upwards slightly. This type of tool enables the tooth flanks to be processed especially close to the base of the tooth. It is possible, but not necessary, for all shaping tools to be equipped with drums with this type of drum groove.

An embodiment according to the invention comprises shaping tools that are connected to one another in such a way that the tool rotational axes can be moved on a common circle. The resulting machining kinetics corresponds to the kinetics that result from spinning. It results in a number of short and powerful impacts in quick succession on the subsurface of the work piece, thereby enabling the induction of strong compressive residual stresses.

In this case, the rolling device preferably has a motor for moving the tool rotational axes on a circle or another closed path. Of all the shaping tools moved on the closed path, only one shaping tool at a time is generally in contact with a work piece.

In order to increase the strengthening effect of the shaping tool, the rolling device may comprise an ultrasound source that is connected to at least one shaping tool for applying ultrasound. The additional vibration of the shaping tool produced by the ultrasound source causes a stronger impact on the subsurface of the work piece.

According to a preferred embodiment, several work pieces, in particular gear wheels, are housed on the work piece accommodation in such a way that the tooth flanks of the work pieces come together to form at least one continuous groove, wherein the guide is configured to guide the shaping tools along the groove. In other words, the guide guides the shaping tools so that their drums run in the at least one groove.

It is beneficial if the work piece accommodation is designed to house the work pieces such that they are torque-proof. This means that any torque acting on a work piece will not cause a change in the work piece relative to the work piece accommodation.

A particularly large rolling force may be applied if the guide is designed to guide at least a number of shaping tools such that the rotational axes of their drums move vertically to the groove. In particular, it is advantageous if the guide is configured to generate a deep rolling force that runs to the centre of the gear wheel in one direction. This results in the generation of a small or insignificant torque that acts on the gear wheel. An equally large rolling force is also applied to the two tooth flanks that are simultaneously processed by a shaping tool.

According to a preferred embodiment, the guide has a first bearing element and a second bearing element, which is guided on the first bearing element, wherein the first bearing element comprises a first advancing device, by means of which the first shaping tool is attached to the first bearing element and that is designed to advance the first shaping tool with a definable rolling force. This means that the shaping occurs independently of any deviations in shape of the work pieces.

The advancing device preferably guides the shaping tool in a straight line only. In other words, the advancing device renders it possible to apply the rolling force independently of any potentially changing distance between the work piece and the first bearing element. Thus, any deviations in shape of the individual work pieces themselves do not result in different subsurface properties.

The advancing device preferably has a hydraulic cylinder that allows the deep rolling force to be adjusted via the hydraulic pressure. Alternatively or additionally, the advancing device may have a spring. It is possible and represents a preferred embodiment for various shaping tools to comprise springs with different spring constants so the rolling force on the respective shaping tools, and thereby the properties of the subsurface in the corresponding regions, remains at least predominantly constant. The deviations in shape of the work pieces are generally so small that, despite the springs, one can assume that the rolling force on the respective shaping tools will be constant. According to a preferred embodiment, the advancing device has an installation for adjusting the distance from the rolling device to the work piece accommodation and/or for adjusting the spring tension.

It is preferable if a majority of the shaping tools, in particular all shaping tools, are attached by means of an advancing device. It is possible that an advancing device advances two or more shaping tools; however, it is especially favourable if each advancing device applies rolling pressure to precisely one shaping tool only.

The rolling device preferably comprises a pressure fluid supply device for the application, in particular the individual application, of pressure fluid to the at least one advancing device. In particular, it may be advantageous for each advancing device to be individually supplied with pressure fluid, or to be designed as such. To this end, the pressure fluid supply device may have a valve for each advancing device that serves to switch fluid pressure on or off.

Within the scope of a method according to the invention, the shaping tools are engaged with the at least one work piece such that, for example, the tooth flank is shaped at a tooth flank base. The tooth flank base should be understood especially to mean the interval between the 28° tangent and the 32° tangent. The 32° tangent is defined in a Cartesian coordinate system, whereby a 0° tangent would lie in the tooth base.

The first shaping tool is preferably moved such that a first shaping region is created in the work piece in which the compressive residual stress is induced, wherein the second shaping tool is moved such that a second shaping region is created in the work piece in which compressive residual stress is induced, and wherein the first shaping region and the second shaping region overlap one another. In particular, the shaping tools are moved at least in their majority in such a way that respective shaping regions are created in which tensile residual stresses were present prior to machining and compressive residual stresses are present post-machining, or in which higher and/or lower compressive residual stresses are achieved post-machining. These types of residual stresses can be radiographically measured, for example.

At least one of the shaping tools is preferably moved such that a 30° tangent of a tooth of the work piece runs in its shaping region. It has been proven that compressive residual tensions within the interval about the 30° tangent have an especially beneficial influence on the fatigue strength of toothings.

The rolling device preferably has a work piece accommodation which houses at least one gear wheel, in particular at least two gear wheels, wherein the first effective axial thickness is selected such that the first region lies in the lowest third of a radial distance from the rotational axis of the gear wheel. The point of the tooth flank with the smallest radial distance is the tooth base. The point of the tooth flank with the greatest radial distance lies on the envelope circle, i.e. the circle with the minimal diameter that surrounds the gear wheel. According to a preferred embodiment, the first effective axial thickness is selected such that the contact points of the first shaping tool lie in the lowest third of the radial distance from the rotational axis of the gear wheel, in particular in the lowest quarter.

At least one shaping tool preferably has, especially at least two of the shaping tools preferably have, a convex cross-section in the section in which they come into contact with the work piece for shaping. In other words, at least one shaping tool lies, in particular at least two of the shaping tools, preferably all shaping tools, have contact with the work piece only in regions that are convex in cross-section. This enables a high surface pressure to be achieved with a low frictional load.

It is beneficial if the rolling device comprises at least three shaping tools with different effective axial thicknesses. Within the scope of a method according to the invention, a tooth flank is processed by at least two, in particular at least three, shaping tools with different effective axial thicknesses.

In the following, the invention will be explained in more detail by way of the attached drawings. They show FIG. 1 a rolling device according to the invention for conducting a method according to the invention, FIG. 2a a cross-section according to the cut A-A through the work piece and a shaping tool, FIG. 2b a cross-section through another shaping tool of a rolling device according to the invention, FIG. 3a a first possible alignment of a shaping tool relative to the tooth flanks of a work piece, FIG. 3b a second possible alignment, FIG. 3c a shaping tool with cylindrical rollers that do not touch one another according to a rolling device according to the invention, FIG. 3d a shaping tool with cylindrical rollers that do touch one another according to another rolling device according to the invention, FIG. 3e a shaping tool with truncated cone-shaped rollers that do not touch one another according to another rolling device according to the invention, FIG. 3f a shaping tool with truncated cone-shaped rollers that do touch one another according to another rolling device according to the invention, FIG. 3g a second embodiment of a shaping tool of a rolling device according to the invention, FIG. 4 a second embodiment of a rolling device according to the invention, FIG. 5 a third embodiment of a rolling device according to the invention, FIG. 6 a fourth embodiment of a rolling device according to the invention, FIG. 7 a fifth embodiment of a rolling device according to the invention, FIG. 8 a sixth embodiment of a rolling device according to the invention, FIG. 9 a seventh embodiment of a rolling device according to the invention, FIG. 10 depicts an embodiment of a rolling device with an ultrasound source.

FIG. 1 shows a schematic view of a rolling device 10 according to the invention for rolling a number of work pieces 12.$i$ ($i$=1, 2, 3, ... ). The rolling device 10 comprises a number of shaping tools 14.$i$ that are fixed to a guide 16. Of course, i is only a numbering index, meaning that the number of the shaping tools 14.$i$ need not correspond to the number of the work pieces 12.$i$.

The guide 16 comprises a first bearing element 18 and a second bearing element 20, wherein the first bearing element 18 is guided along the second bearing element 20. The shaping tools have rollers that are rotatably mounted about a respective tool rotational axis $D_{14.1}$. The first bearing element 18 comprises a first advancing device 22.1 that is designed as a hydraulic cylinder and by means of which the first shaping tool 14.1 can be moved in an advancing direction R. The advancing device 22 is connected to a pressure fluid supply device 24 so pressure fluid subject to a fluid pressure p, such as a hydraulic oil, can be supplied.

The shaping tools 14 (any reference without a numerical suffix refers to all relevant objects) each have their own advancing device 22. Each advancing device 22.1 can be applied with fluid pressure or de-pressurised via valves (not depicted). Furthermore, it is possible that the pressure fluid supply device 24 is configured to supply pressure fluid to each advancing device 22.$i$ at an individual fluid pressure $p_i$.

In the present case, the guide is designed to be a linear guide and arranged to be rigid relative to a work piece accommodation 26. The guide 16 is schematically depicted in the lower partial image. The guide 16 may be advanced on the work piece accommodation 26 by means of a linear axis 28, for example. The linear axis 28 may be hydraulically driven, for instance. In addition, the first bearing element 18 can be moved by means of a schematically depicted drive 30 relative to the second bearing element 20. The drive 30 may comprise a ball screw drive that is driven by an electric motor. Alternatively, the first bearing element 18 may be designed such that it can be moved relative to the second bearing element 20 by means of a hydraulic cylinder.

The work piece accommodation 26 can be automatically rotated about its longitudinal axis L by means of a rotary actuator 32. The rotary actuator 32 is connected to a schematically depicted control unit 34, which is also connected to the pressure fluid supply device 24.

The lower partial image shows that the work pieces 12.$i$, which are gear wheels, are arranged in such a way that tooth flanks come together to form a continuous groove 36.

To this end, the work pieces 12.$i$ are at a work piece angle γ relative to the longitudinal axis, wherein the work piece angle γ corresponds to a helix angle β at which the tooth flanks run relative to a longitudinal axis $L_{12}$ of the respective work piece 12. In this case, the groove 36 to run along the longitudinal axis L, meaning that the groove 36 forms an angle of 0° with the longitudinal axis L.

The control unit 34 is configured to advance the shaping tools 14 onto the work pieces 12.$i$ so the rollers 46.$i$ of the shaping tools 14.$i$ engage with the groove 36, and to subsequently move the shaping tools 14.$i$ through the groove 36 so each roller 46.$i$ of the shaping tools 14.$i$ comes into contact with each of the work pieces 12.$i$. The shaping tools are then placed at a distance from the work pieces 12.$i$ and the individual work pieces 12.$i$ are subsequently rotated individually relative to the work piece accommodation 26 such that a new groove is arranged in such a way that is can be processed with the shaping tools 14.$i$. The shaping tools 14.$i$ are then pressed into this groove with a rolling force $F_W$ and once again moved along a newly created groove, thereby enabling further tooth flanks to be processed.

FIG. 2 shows a schematic cut along A-A. Section A1 to the left contains a schematic depiction of how the shaping tools 14.1, 14.2 and 14.3 roll past a first tooth flank 38 one after the other, thereby shaping it. During this process, the first shaping tool 14.1 generates a first shaped region B1 by means of its roller 46.1, the second shaping tool 14.2 creates a second shaped region B2 by means of its roller 46.2, and the third shaping tool 14.3 a third region B3 by means of its roller 46.3. The three regions differ from one another, meaning that there are points that belong to only one region and not the others. Furthermore, the regions B overlap one another.

An envelope circle H is also depicted. This is the circle with the smallest diameter that surrounds the work piece 12, such as the gear wheel. A circle G, which has the same centre point as the envelope circle H, runs through a tooth base 47. The base of the tooth flank extends around the base of the tooth 47.

FIG. 2b shows that the rollers 46.$i$ are of different effective thicknesses $d_i$. Accordingly, the effective axial thickness $d_1$ of the roller 46.1 of the first shaping tool 14.1 is smaller than the second effective thickness $d_2$ of the roller 46.2 of the second shaping tool 14.2. Since the tooth flanks of adjacent teeth—here, the tooth flanks 38 and 40 of the teeth 42.1 and 42.2—run towards each other in the tooth base 47, the shaping tools 14.1, 14.2, 14.3 penetrate the gap between the teeth between the two tooth flanks 38, 40 to different depths; this causes different regions Bi to be shaped.

It should be noted that the rolling device has a work piece accommodation which houses at least one gear wheel, in particular at least two gear wheels, wherein the first effective axial thickness $d_1$ is selected such that the first region B1 lies in the lowest third of a radial distance from the rotational axis of the gear wheel 12. In other words, a radial distance from the circle G is smaller than the sum of the radius of the circle G and a third of the difference between the radii of the circles G and H.

FIG. 2b shows that the shaping tools 14.i are arranged behind one another in a single track. This means that their rollers 46.i run consecutively in the same groove 36.

In the arrangement according to FIG. 2, the rolling force {right arrow over (F.sub.W)} is induced in the radial direction. In other words, the direction in which the rolling force {right arrow over (F.sub.W)} is induced runs towards a centre point of the work piece 12, not visible in FIG. 2. The rolling force {right arrow over (F.sub.W)} forms the same angle with a first axis S1, which runs through the centre point of the work piece 12.1 and through the centre of the tooth 42.1, as a second axis S2, which runs through the centre point of the work piece 12 and through the centre of the adjacent tooth 42.2. As a result, a normal force {right arrow over (F.sub.n,38)}, which acts vertically on the first tooth flank 38, is as great in terms of value as a second normal force {right arrow over (F.sub.n,40)}, which acts on the second tooth flank. The rolling force components cause a reduction in the surface roughness in the regions B1, B2, . . . and the induction of compressive residual tensions in the subsurface.

FIG. 3a depicts the rollers 46.1 of the shaping tool 14.1 in a gap between the teeth 44 between the first tooth flank 38 and the second tooth flank 40 of the first work piece 12.1, which is part of the groove 36. It should be recognised that the rotational axis D.sub.14.1 runs perpendicular to the direction of the extension of the gap between the teeth 44 and thus the groove 36. This means that the rotational axis D.sub.14.1 also runs perpendicular to a path of movement P along which the shaping tool 14.1 is moved relative to the work piece during machining. The trajectory T runs along the groove 36.

FIG. 3b depicts the case in which the rotational axis $D_{14.1}$ has a tilt angle κ to the perpendicular to the path of movement P. This generates a torque on the shaping tool 14 that runs parallel to the rolling force $F_W$.

FIG. 3c shows an embodiment of a shaping tool 14.1 with two drums 46.1, 46.2. The drums are rotatably mounted in a cage and mutually support each other. The cage can be rotated about the central axis $D_{14.1}$. The effective width W of the rollers can be adjusted by changing the angle of rotation $\varepsilon_{14.1}$. This renders it possible to set pairs of rollers that are arranged behind one another to different widths in order to process different zones. Alternatively, one or several pairs of rollers can pass through the groove 36 while oscillating and the effective width can be individually adjusted for a new machining zone by means of a swivel drive.

FIG. 3c depicts a shaping tool 14.1 that comprises two drums 46.1 and 46.2. Both drums 46.1, 46.2 are cylindrical and each of their rotational axes $D_{46.1}$, $D_{46.2}$ run parallel to each other. The distance of the rotational axes $D_{46.1}$, $D_{46.2}$ and the diameter of the drums 46.1, 46.2 define an effective width W. The effective width W provides the distance of the two points that are simultaneously processed by the shaping tool 14.1.

The lower partial image shows a view from above. It should be noted that the shaping tool 14.1 can be rotated about an angle of rotation ε. The effective width W can be adjusted by changing the angle of rotation ε. The two drums 46.1, 46.2 are arranged at a distance from each other.

FIG. 3d shows a shaping tool of a rolling device according to the invention, whereby the drums 46.1, 46.2 are in contact with each other. This means that the forces acting on the tooth flanks can be easily absorbed so they do not act on the respective rotational axes $D_{46.1}$, $D_{46.2}$. This renders it possible to set shaping tools that are arranged behind one another to different effective widths W in order to process different zones B (see FIG. 2). Alternatively, one or several shaping tools, each with two drums 46.1, 46.2, can pass through the groove 36 several times and the effective width W for each cycle can be individually adjusted for a new machining zone by means of a swivel drive. The drums 46.1, 46.3 can be rotatably mounted in a cage. The cage can be rotated about the central axis $D_{14.1}$. The effective width W of the drums 46.1, 46.2 can be adjusted by changing the angle of rotation e.

Figure 3A:
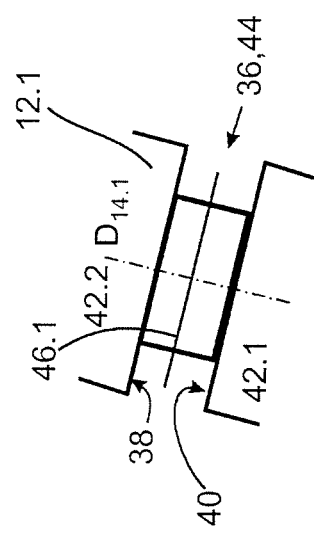
FIG. 3e depicts a further embodiment of a shaping tool for a rolling device according to the invention, whereby the drums 46.1, 46.2 are frustum-shaped and are situated at a distance from one another.
FIG. 3f shows a further embodiment wherein the drums 46.1, 46.2 are designed to be in the shape of a truncated cone and to touch one another. In each of the embodiments given, the drums 46.1, 46.2 may comprise a convexity.
Figure 3B:
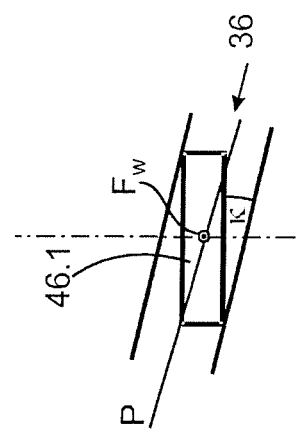
Figures 3C, 3D:
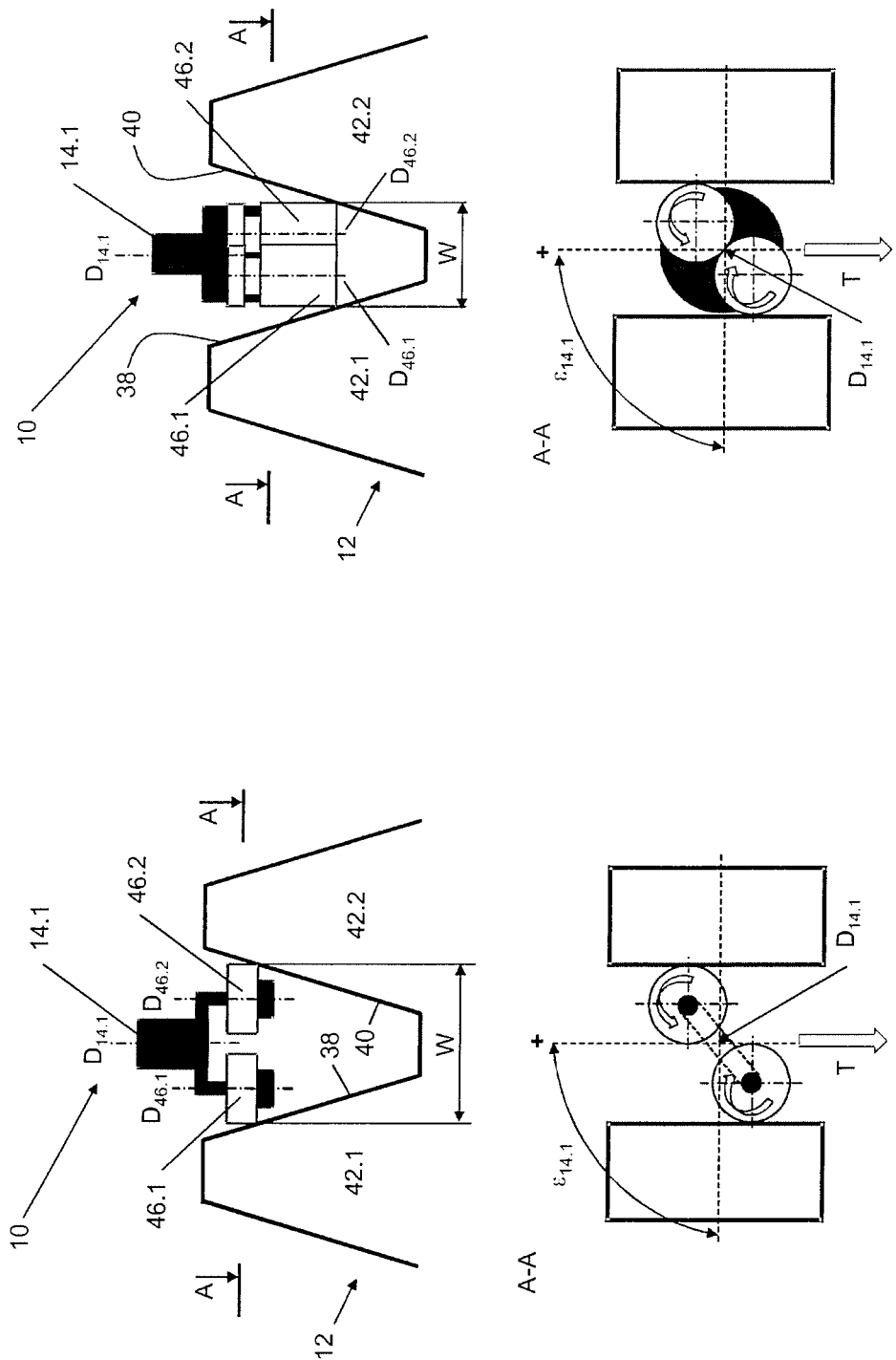
Figure 3F:
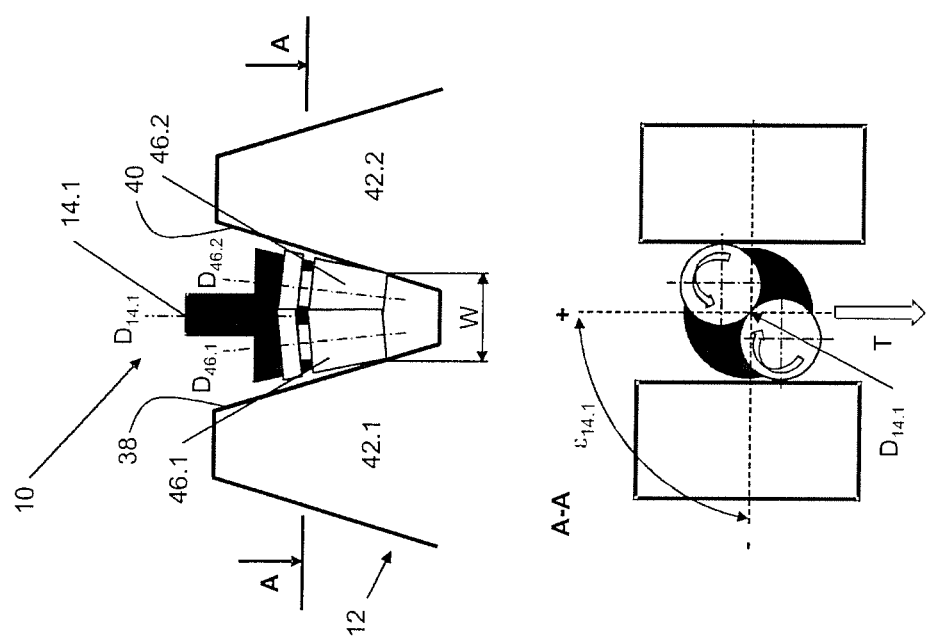
Figure 3E:
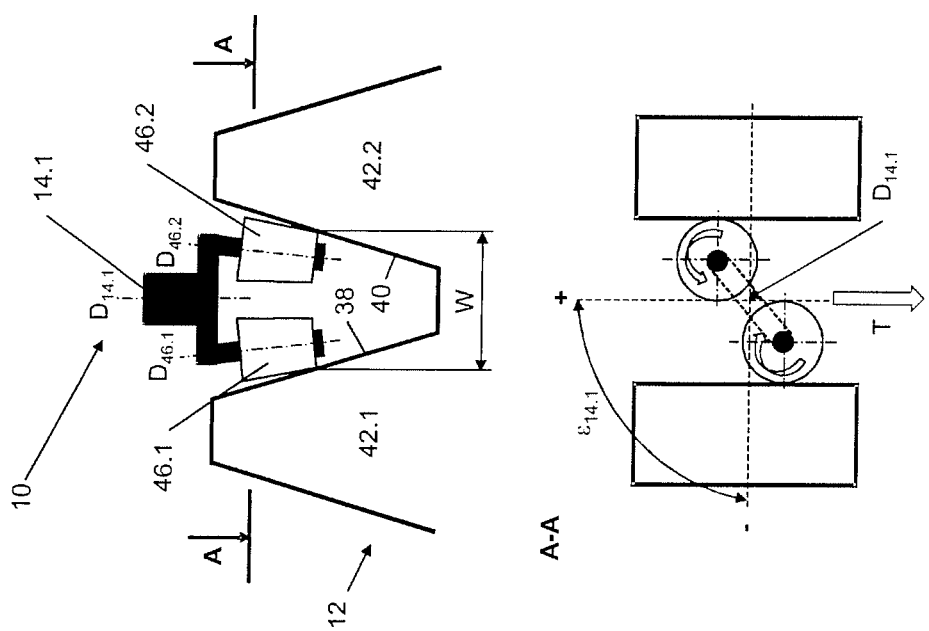
Figure 3G:
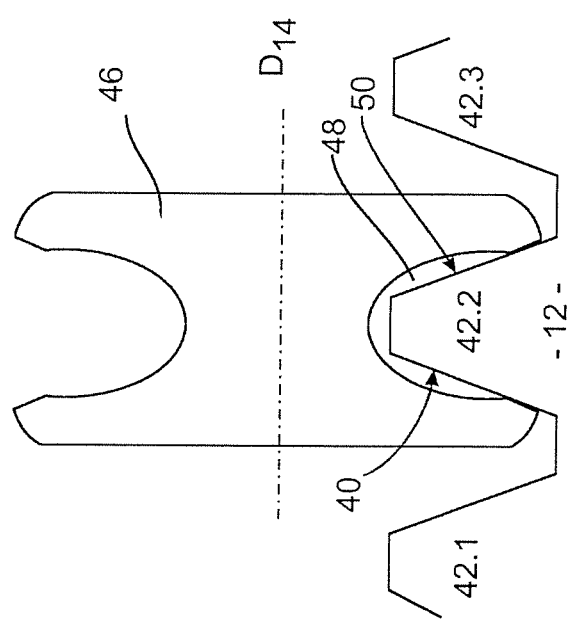

FIG. 3g depicts a further embodiment of a shaping tool 14 whose roller 46 has a drum groove 48 around its circumference. The drum groove 48 is designed in such a way that the two opposing tooth flanks 40, 50 of a tooth—in the present case, the tooth 42.2—can be processed simultaneously.

Figure 4:
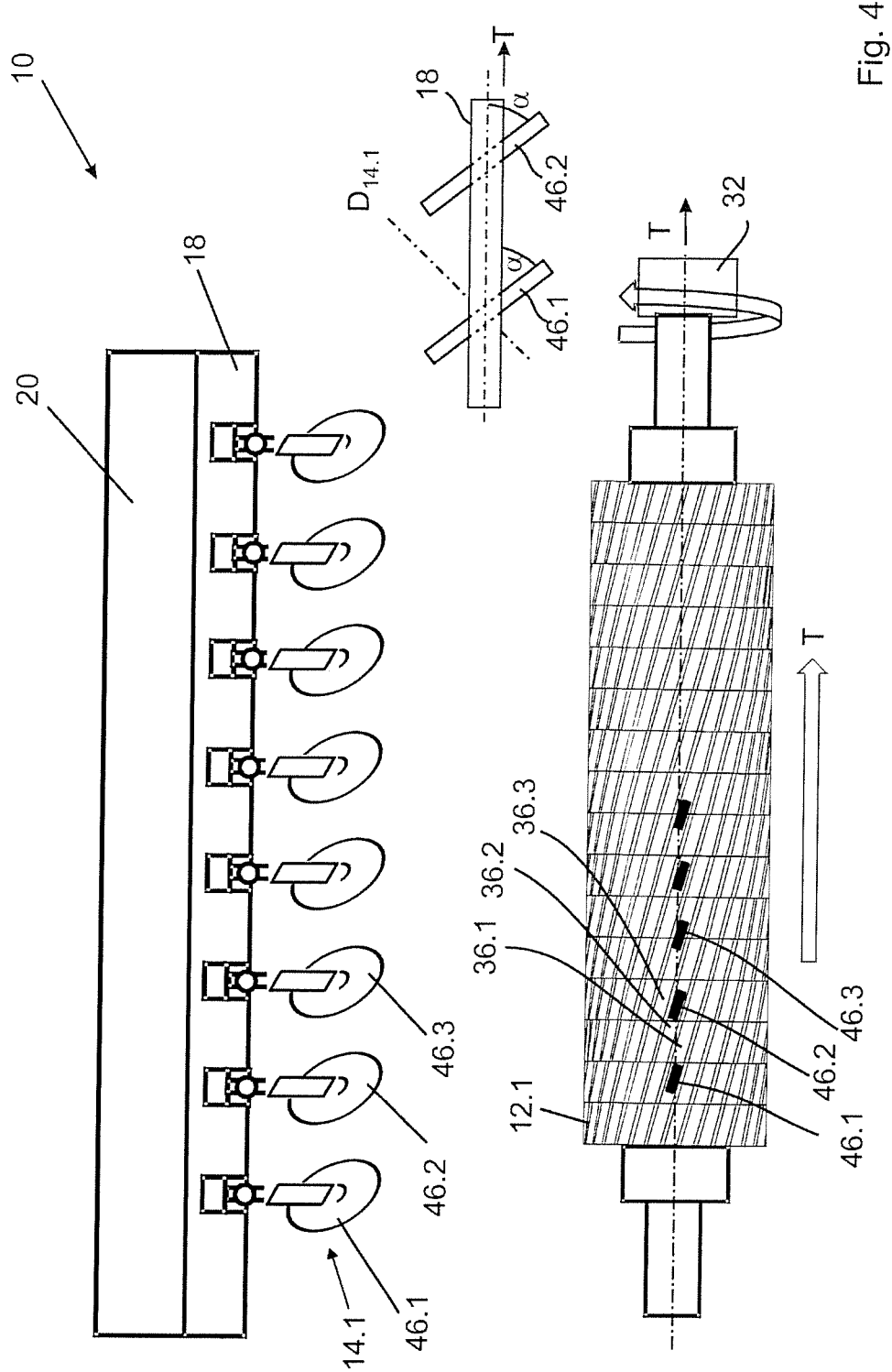

FIG. 4 shows another embodiment of a rolling device according to the invention 10 whereby the shaping tools 14.i are arranged behind one another in multiple tracks; in other words, the individual rollers 46.i of the shaping tools 14.i run in different grooves. In this case, the roller 46.1 of the first shaping tool 14.1 runs in the first groove 36.1, the roller 46.2 of the second shaping tool in the groove 36.2, the roller 46.3 of the third shaping tool 14.3 in the third groove 36.3. The trajectory T of the movement of the first bearing element 18 runs along the longitudinal axis L; in the present embodiment, the guide 16 is thus a linear guide.

The shaping tools 14 are attached to the first bearing element 18 at a tool angle α that is different to 90°. The work piece angle γ defines the angle at which a direction of movement of the shaping tool 14 runs towards the trajectory T. The tool angle α corresponds to the angle that the respective rotational axis D or, for instance, the rotational axis $D_{14.1}$ forms on the trajectory T with the perpendicular. In the case of a linear guide, the trajectory T corresponds to the direction in which the first bearing element 18 can move relative to the second bearing element 20, i.e. a straight line.

Figure 1:
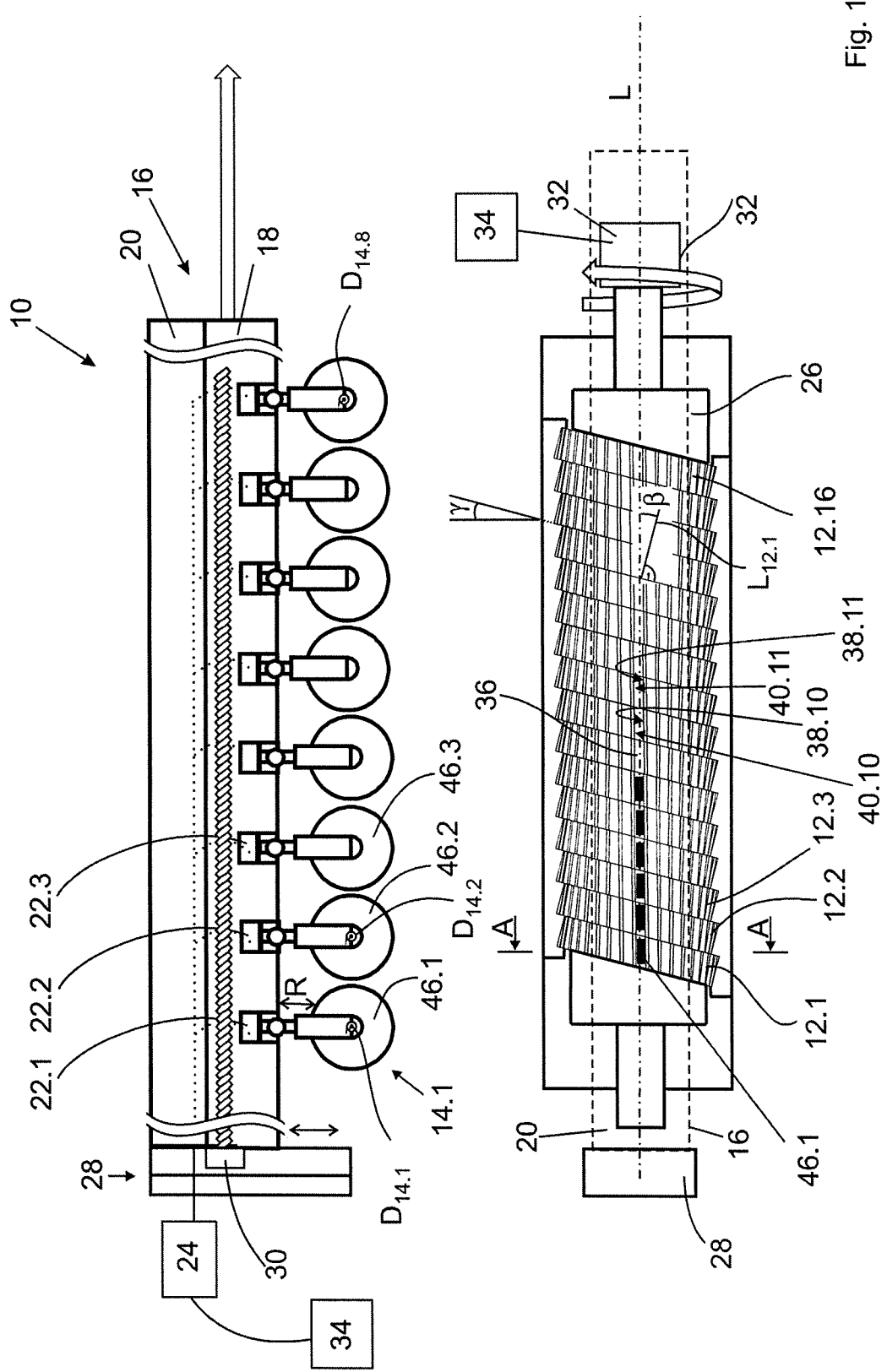

In the embodiment according to FIG. 4, the rotary actuator 32 is configured to rotate continuously while the shaping tools 14.i move along the longitudinal axis L. In the embodiment according to FIG. 1, the tool angle is α=0°.

Figure 5:
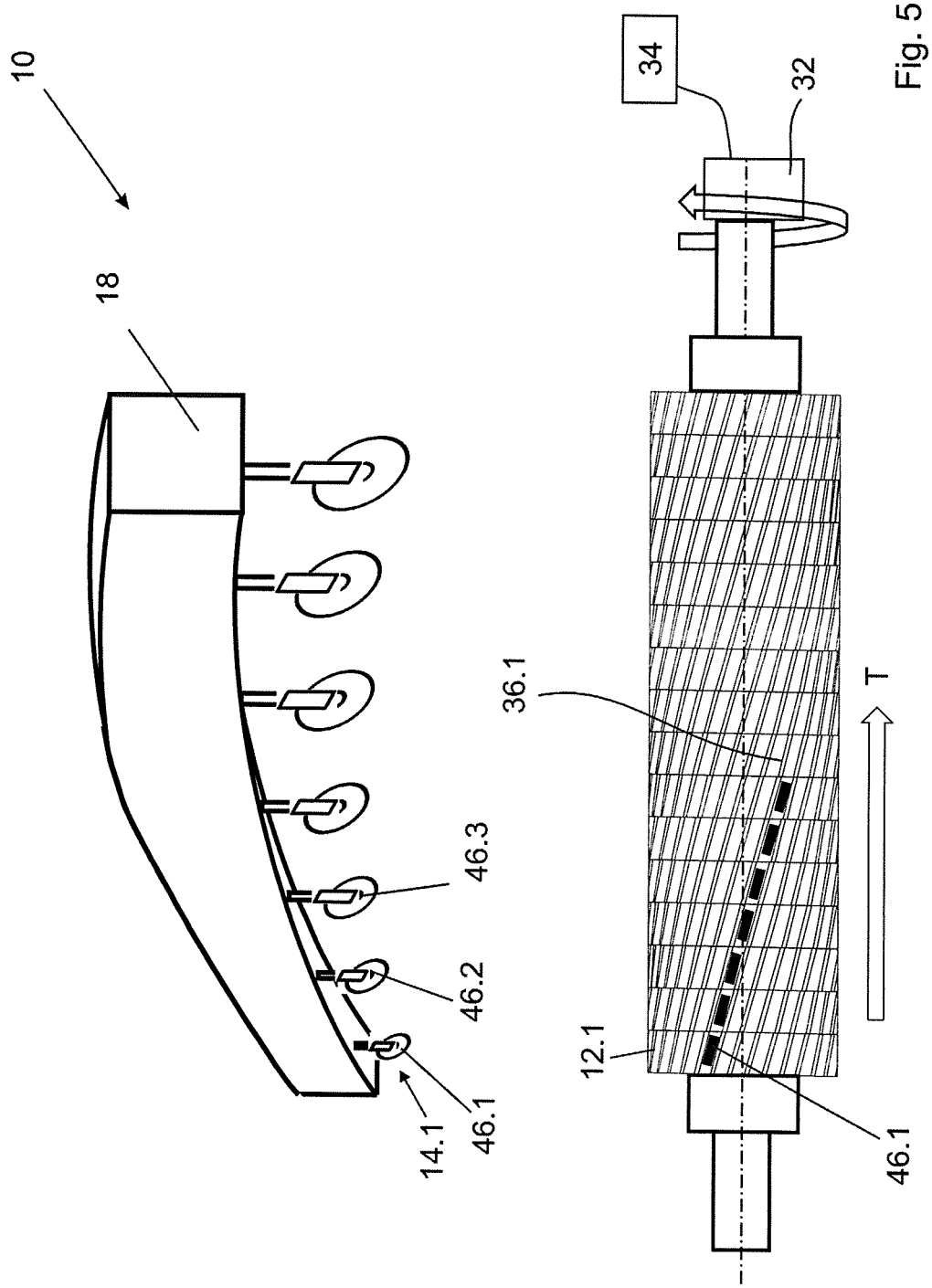

FIG. 5 depicts another embodiment of a rolling device according to the invention 10, whereby the shaping tools 14.i are arranged in a single track. The first bearing element 18 is designed to be helical so the shaping tools 14.i can simultaneously shape the work pieces 12.i. In this case, all rollers 46.1 of the shaping tools 14.i run in the same groove 36.1.

Figure 6:
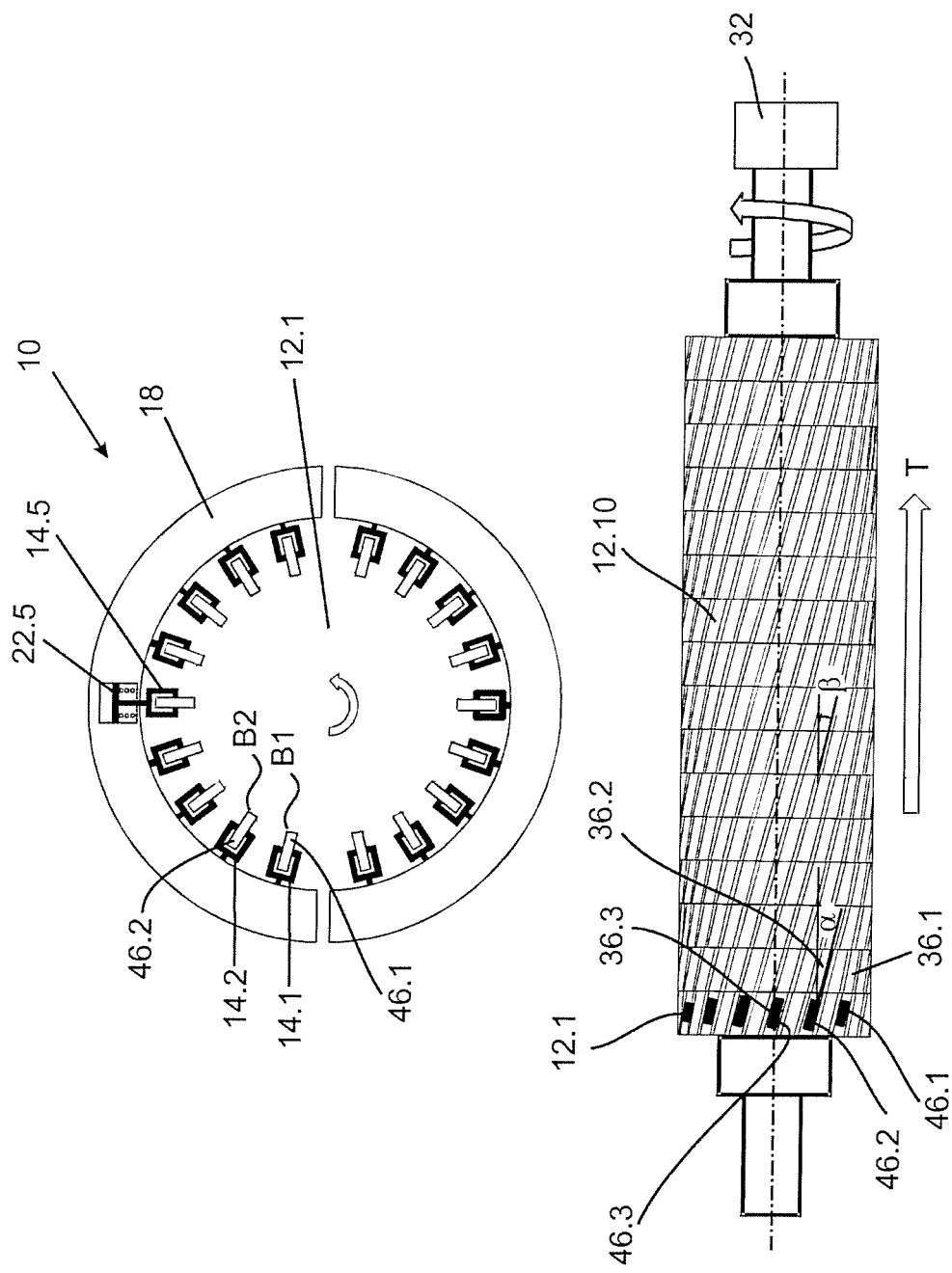

FIG. 6 shows a further embodiment of a rolling device 10 according to the invention, whereby—as is the case in the previous embodiments—each shaping tool 14.i is fixed to the first bearing element 18 by means of an advancing device 22. For the sake of clarity, only the advancing device 22.5 is depicted. The first bearing element 18 is designed such that the shaping tools are arranged along an imaginary arc along the first bearing element 18. This renders it possible to simultaneously engage the shaping tools with the same work piece.

The lower partial image depicts how the shaping tools are simultaneously engaged with the first work piece 12.1. In other words, different rollers 46.1 of the shaping tools engage in different grooves at the same time and process the respective tooth flanks. The rotary actuator 32 is configured to rotate continuously, the rollers 46.i of the shaping tools 14.i are attached to the first bearing element 18 at the tool angle α, which corresponds to the helix angle β of the work pieces 12.i. The number of shaping tools 14.i corresponds to half the number of teeth. As a result, all tooth flanks of all work pieces can be processed in two machining cycles.

Figure 7:
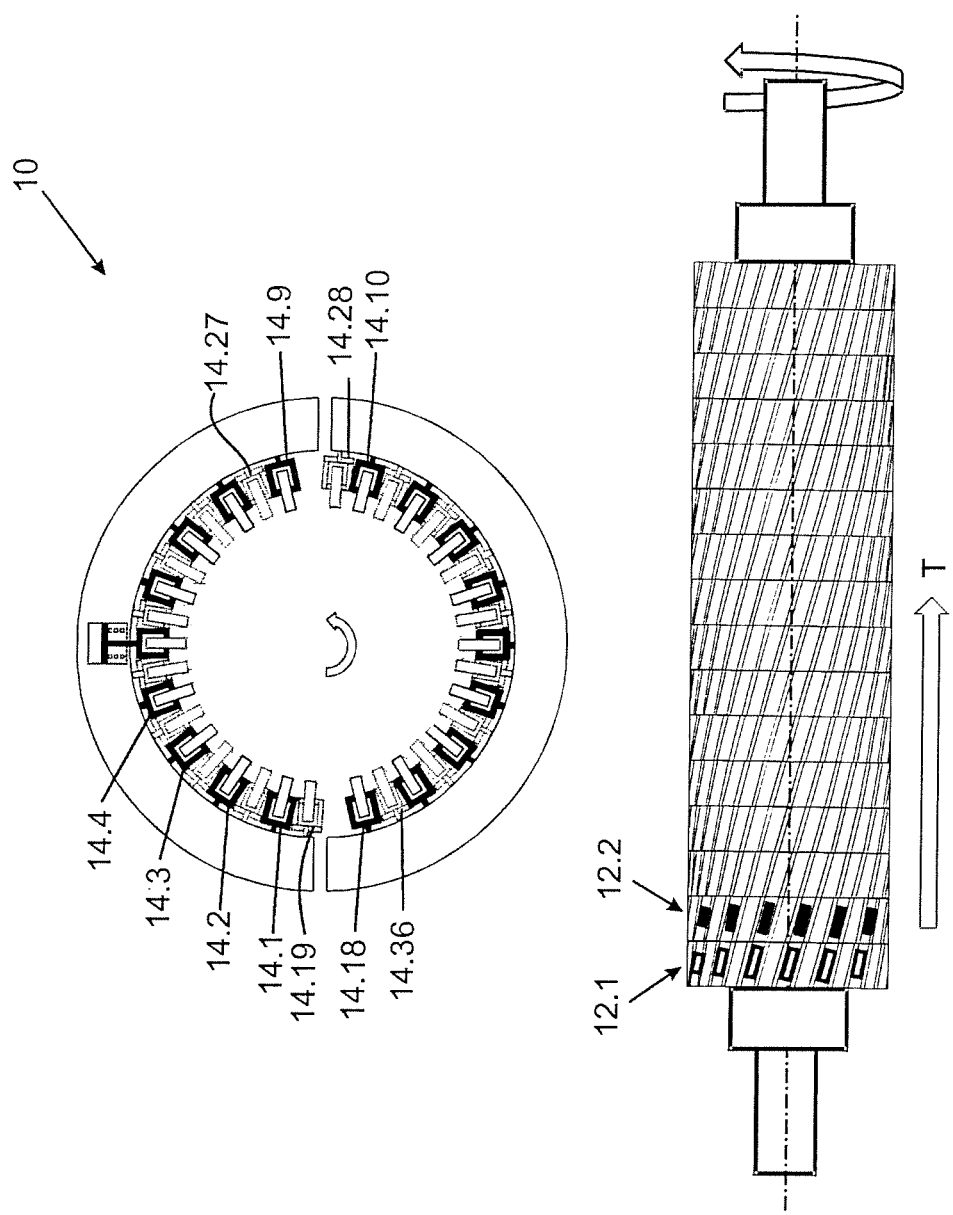

FIG. 7 depicts a further embodiment of a rolling device according to the invention 10 that, alongside a first set of shaping tools arranged along a first imaginary arc on the first bearing element 18 as depicted in FIG. 6, comprises additional shaping tools that are arranged along a second arc, which is situated at a distance from the first in the axial direction. During operation, the tools 14.1, . . . , 14.18 of the first rings are engaged with the second work piece 12.2, for example, while the shaping tools 14.19, . . . , 14.36 of the second ring are engaged with the first work piece 12.1. Of course, more sets of shaping tools 14 may be provided, wherein each set of shaping tools 14 is arranged along a ring.

Figure 8:
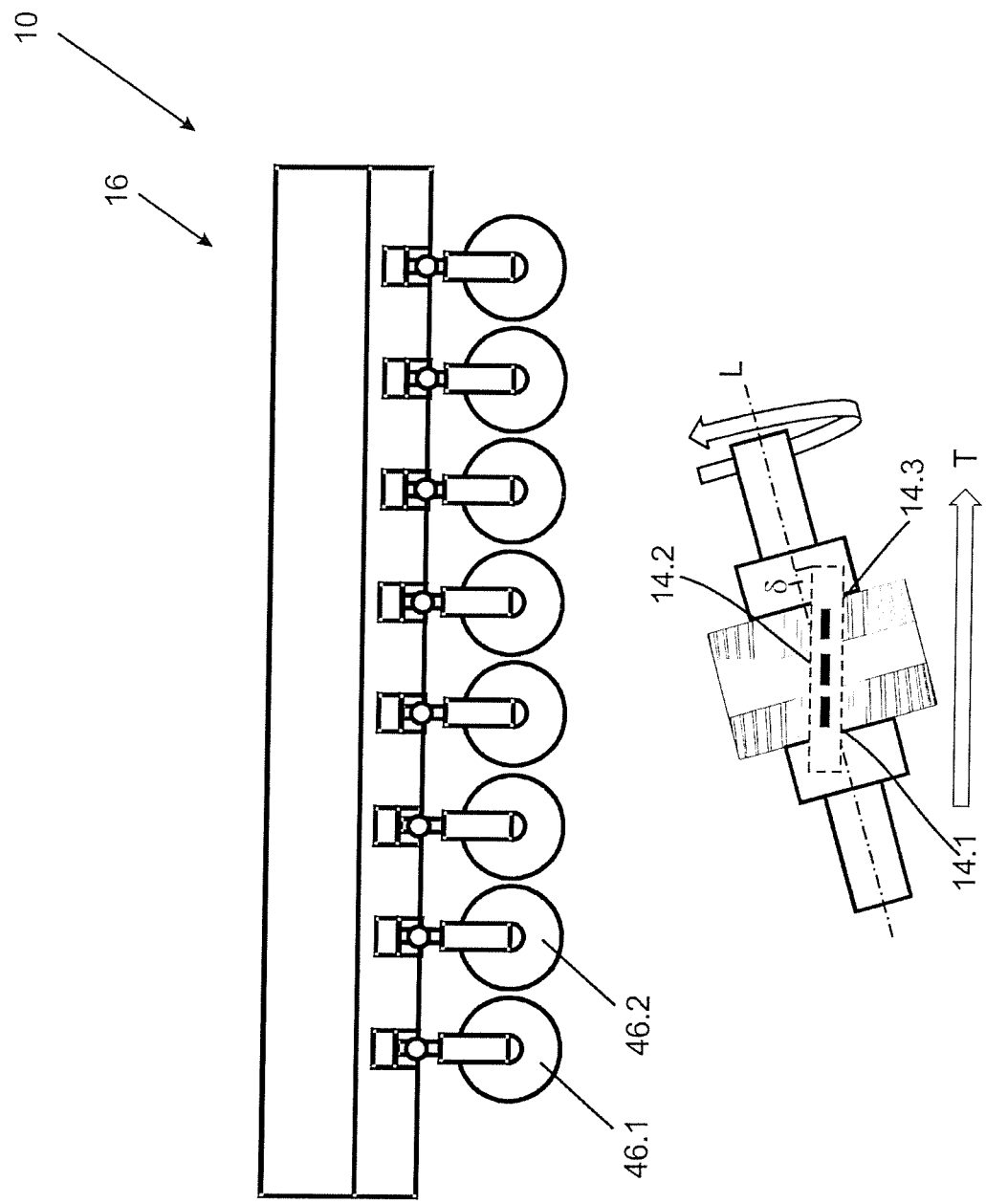

FIG. 8 shows another embodiment of a rolling device according to the invention 10 whose guide 16 is a linear guide, which—as schematically depicted in the lower partial image—is configured to guide the shaping tools 14.i at a tipping angle δ to the longitudinal axis L.

Figure 9:
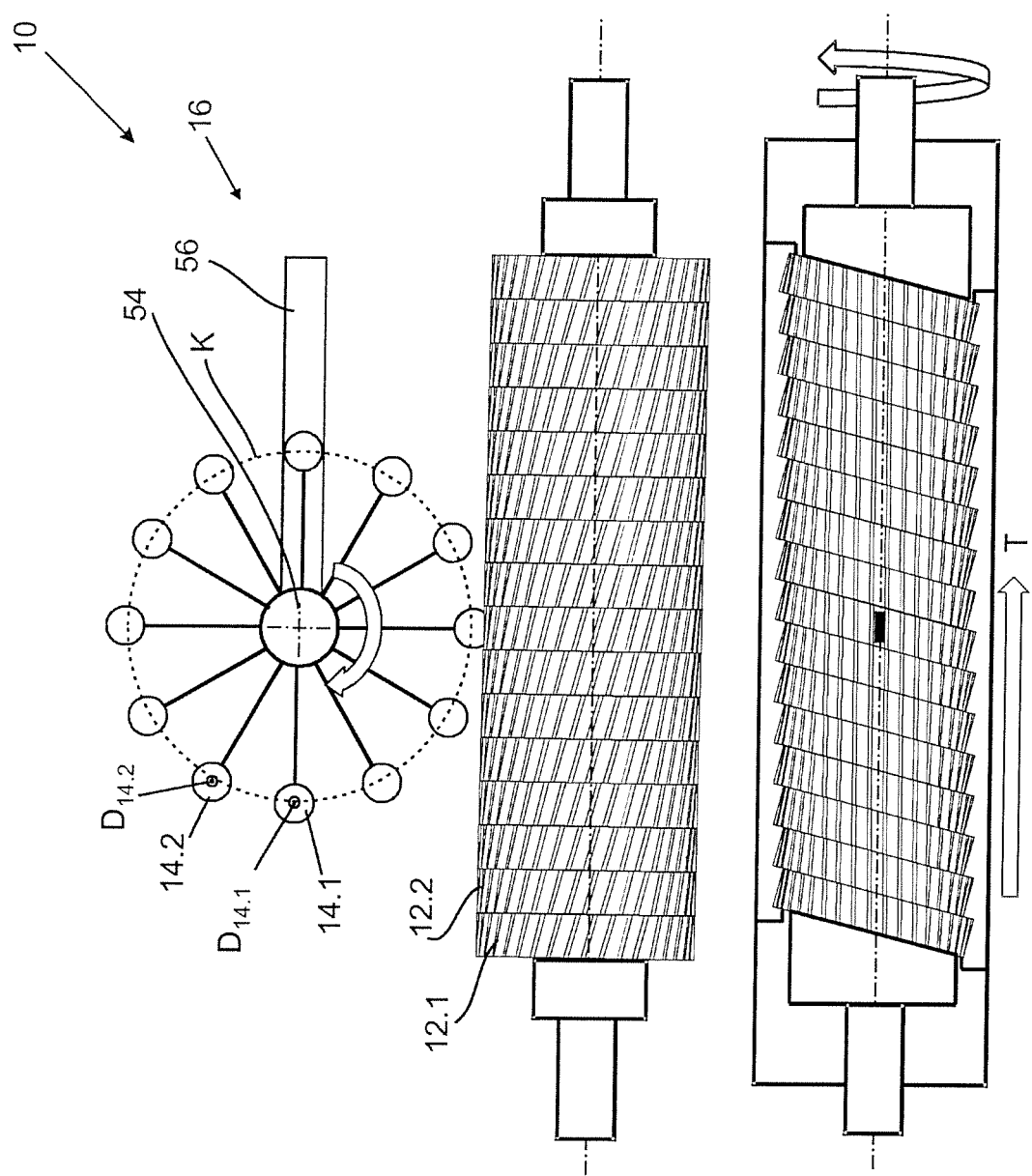

FIG. 9 depicts a further embodiment of a rolling device according to the invention 10, whereby the shaping tools 14.1 are attached to a guide 16 that enables a combined rotational and translational movement. In other words, the guide 16 in the present case is a combined rotary-linear guide with a rotation device 54 and a linear axis 56.

The tool rotational axes $D_{14.i}$ move on a common circle K. This embodiment differs from the previous embodiments in that each individual shaping tool 14.i only comes into contact with the respective work piece for a short period of time and therefore only covers a short shaping path before the respective shaping tool 14.i moves away from the work piece again.

FIG. 10 depicts an advancing device 22 with an ultrasound source 52. The ultrasound source 52 is connected to the control unit 34 which it subjects to a high frequency alternating current. The ultrasound causes the rolling effect of the tool 14.1 to intensify.

REFERENCE LIST

| 10 | rolling device | B | region |
|---|---|---|---|
| 12 | work piece | d | thickness |
| 14 | shaping tool | D | rotational axis |
| 16 | bearing | $F_n$ | normal force |
| 18 | first bearing element | $F_W$ | rolling force |
| 20 | second bearing element | K | circle |
| 22 | advancing device | L | longitudinal axis |
| 24 | pressure fluid supply device | p | fluid pressure |
| 25 | device | R | advancing direction |
| 26 | work piece accommodation | S | axis |
| 28 | linear axis | T | trajectory |
| 30 | drive | W | effective width |
| 32 | rotary actuator | G | circle through tooth base |
| 34 | control unit | H | envelope circle |
| 36 | groove | α | tool angle |
| 38 | first tooth flank | β | helix angle |
| 40 | second tooth flank | γ | work piece angle |
| 42 | tooth | δ | tipping angle |
| 44 | gap between the teeth | ε | angle of rotation |
| 46 | drum | κ | tilt angle |
| 47 | tooth base | | |
| 48 | drum groove | | |
| 50 | tooth flank | | |
| 52 | ultrasound source | | |
| 54 | rotary device | | |
| 56 | linear axis | | |

The invention claimed is:

1. A rolling device for work pieces with toothing, comprising:
   a work piece accommodation configured to house a plurality of work pieces with toothing such that tooth flanks of the plurality of work pieces with toothing come together to form at least one continuous groove,
   a first shaping tool,
   at least one second shaping tool, and
   at least one guide configured for guided movement of the first shaping tool and the at least one second shaping tool relative to one or more work pieces of the plurality of workpieces with toothing such that a first region of a tooth flank of the one or more work pieces is shaped with the first shaping tool and a second region of the tooth flank that is different from the first region of the tooth flank is shaped by the at least one second shaping tool,
   wherein the at least one guide is configured to guide the first shaping tool and the at least one second shaping tool along the at least one continuous groove,
   wherein the first shaping tool has at least a first roller that is rotatably mounted about a first tool rotational axis,
   wherein the at least one second shaping tool has at least a second roller that is rotatably mounted about a second tool rotational axis,
   wherein the first shaping tool has a first effective axial thickness, and
   wherein the at least one second shaping tool has a second effective axial thickness,
   wherein the second effective axial thickness differs from the first effective axial thickness.

2. The rolling device according to claim 1, wherein one or more of the first shaping tool and the at least one second shaping tool is fixed to the at least one guide.

3. The rolling device according to claim 1 wherein the work piece accommodation houses at least a first work piece and at least a second work piece of the plurality of work pieces, wherein the at least one guide is configured to guide the first shaping tool and the at least one second shaping tool relative to the work piece accommodation.

4. The rolling device according to claim 3, wherein the work piece accommodation houses the at least a first work piece and the at least a second work piece at a helix angle, and wherein the work piece accommodation comprises a rotary actuator for rotating one or more of the at least a first work piece, the at least a second work piece, and the work piece accommodation relative to the at least one guide.

5. The rolling device according to claim 3 wherein one or more of the first shaping tool and the at least one second shaping tool are mounted on the at least one guide in such a way that more than one of the first shaping tool and the at least one second shaping tool is engaged with the at least a first work piece, and more than one of the first shaping tool and the at least one second shaping tool are simultaneously engaged with the at least a second work piece.

6. The rolling device according to claim 1 wherein the first shaping tool and the at least one second shaping tool are arranged to simultaneously apply a first rolling force component that acts on a first tooth flank, and a second rolling force component that acts on a tooth flank opposing the first tooth flank, wherein the first rolling force component corresponds to the second rolling force component in terms of value.

7. The rolling device according to claim 1 wherein the first shaping tool and the at least one second shaping tool are connected to the at least one guide such that the first and second tool rotational axes are moved on a common circle.

8. The rolling device according to claim 1 wherein
the at least one guide comprises a first bearing element and a second bearing element on which the first bearing element and the second bearing element are guided,
wherein the first bearing element comprises a first advancing device by means of which the first shaping tool is fixed to the first bearing element and that is configured to advance the first shaping tool with a definable rolling force.

9. A method for rolling teeth of toothed work pieces, comprising the steps:
(a) arranging in the work piece accommodation of the rolling device according to claim 3 the at least a first work piece and the at least a second work piece, wherein the at least a first work piece and the at least a second work piece are gear wheels, and
(b) guiding movement of the first shaping tool and the at least one second shaping tool relative to the work piece accommodation, such that a first region of a tooth flank of a gear wheel of the gear wheels is shaped with the first shaping tool, and a second region of the tooth flank which is different from the first region and/or a second region of a second tooth flank is shaped by the second shaping tool.

10. The method according to claim 9, wherein the arranging step is performed such that the first and second shaping tools are engaged with the gear wheels such that tooth flanks of the gear wheels are shaped at a base of the tooth flanks.

11. The rolling device according to claim 1 wherein the at least one guide is configured to move one or more of the first shaping tool and the at least one second shaping tool.

12. The rolling device according to claim 1 wherein the first shaping tool and the at least one second shaping tool are configured to introduce residual stress into a subsurface of the plurality of work pieces.

13. The rolling device according to claim 1 wherein the first shaping tool and the at least one second shaping tool are fixed to the at least one guide such that, when in operation, the first shaping tool and the at least one second shaping tool roll on the plurality of work pieces without slipping.

14. The rolling device according to claim 1 wherein the first shaping tool and the at least one second shaping tool are in point contact with surfaces of the work pieces.

\* \* \* \* \*